(12) United States Patent
Baer et al.

(10) Patent No.: US 8,881,588 B2
(45) Date of Patent: Nov. 11, 2014

(54) DIELECTRIC ANTENNA AND FILL LEVEL SENSOR USING THE RADAR PRINCIPLE

(75) Inventors: Christoph Baer, Hattingen (DE); Christian Schulz, Bochum (DE); Michael Gerding, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 273 days.

(21) Appl. No.: 13/569,488

(22) Filed: Aug. 8, 2012

(65) Prior Publication Data

US 2013/0220011 A1 Aug. 29, 2013

(30) Foreign Application Priority Data

Feb. 23, 2012 (DE) .......................... 10 2012 003 398

(51) Int. Cl.
*G01F 23/284* (2006.01)
(52) U.S. Cl.
USPC .......................................................... 73/293
(58) Field of Classification Search
CPC . G01F 23/284; G01F 23/2845; G01F 23/288; G01F 23/2885
USPC .......................................................... 73/293
See application file for complete search history.

(56) References Cited

U.S. PATENT DOCUMENTS

| | | | |
|---|---|---|---|
| 2,887,684 A | 5/1959 | Dexter et al. | |
| 5,262,743 A * | 11/1993 | Jean | 333/252 |
| 6,339,468 B1 * | 1/2002 | Clifford et al. | 356/4.01 |
| 6,462,717 B1 | 10/2002 | Wheelock et al. | |
| 6,531,989 B1 | 3/2003 | Barker et al. | |
| 6,606,077 B2 | 8/2003 | Ebling et al. | |
| 6,986,294 B2 * | 1/2006 | Fromme et al. | 73/865.8 |
| 7,408,501 B2 | 8/2008 | Rolfes et al. | |
| 7,861,600 B2 * | 1/2011 | Mayer et al. | 73/861 |
| 7,872,610 B2 * | 1/2011 | Motzer et al. | 343/785 |
| 7,940,207 B1 * | 5/2011 | Kienzle et al. | 342/124 |
| 8,351,127 B2 | 1/2013 | Black, Jr. et al. | |
| 2004/0173020 A1 * | 9/2004 | Edvardsson | 73/290 V |
| 2009/0262038 A1 | 10/2009 | Gerding et al. | |
| 2010/0060512 A1 * | 3/2010 | Garrod et al. | 342/124 |
| 2010/0090883 A1 * | 4/2010 | Chen et al. | 342/124 |
| 2010/0321262 A1 | 12/2010 | Pohl | |
| 2011/0221629 A1 * | 9/2011 | Edvardsson et al. | 342/124 |
| 2013/0228011 A1 * | 9/2013 | Pohl et al. | 73/290 V |
| 2014/0084129 A1 * | 3/2014 | Sandy | 248/554 |

FOREIGN PATENT DOCUMENTS

| | | |
|---|---|---|
| DE | 38 40 451 A1 | 6/1990 |
| DE | 197 22 547 A1 | 12/1998 |
| EP | 1 089 377 A2 | 4/2001 |
| EP | 1 089 377 B1 | 12/2004 |
| WO | 03/017552 A2 | 2/2003 |

\* cited by examiner

*Primary Examiner* — G. Bradley Bennett
(74) *Attorney, Agent, or Firm* — Roberts Mlotkowski Safran & Cole, P.C.; David S. Safran

(57) ABSTRACT

A dielectric antenna (1) having at least one supply element (2) and at least one lens (3) formed of a dielectric material. The dielectric antenna makes it possible to measure the surface of a medium with an essentially consistent measuring accuracy in that the lens (3) has an outer component (4) and an inner component (5). The outer component (4) has a radiating surface (6) that is spherical and an inner surface (7) that is spherical, and the inner component (5) has a contact surface (8) that spherical. Furthermore, the antenna is usable as part of a fill level sensor operating on the radar principle.

21 Claims, 2 Drawing Sheets

DIELECTRIC ANTENNA AND FILL LEVEL SENSOR USING THE RADAR PRINCIPLE

BACKGROUND OF THE INVENTION

1. Field of the Invention

The invention relates to a dielectric antenna having at least one supply element and at least one lens consisting of at least one dielectric material, wherein the supply element emits electromagnetic radiation and supplies the lens with the electromagnetic radiation, wherein the lens guides the electromagnetic radiation further and radiates it.

2. Description of Related Art

In industrial measurement technology, radar fill level sensors are often used for determining the fill level of media, such as liquids, bulk materials and also slurries in containers, such as tanks or silos. The transit time method implemented by the measuring device is based on the physical law that the path, e.g., of an electromagnetic signal is equal to the product of transit time and propagation speed. In the case of measurement of the fill level of a medium—for example, a liquid or a bulk material—in a container, the path corresponds to twice the distance between an antenna emitting an electromagnetic signal and receiving it again and the surface of the medium. The wanted echo signal—i.e., the signal reflected on the surface of the medium—and its transit time are determined using the so-called echo function or the digitized envelope curve. The envelope curve represents the amplitudes of the echo signals as a function of the distance "antenna—surface of the medium". The fill level can be calculated from the difference between the known distance of the antenna to the floor of the container and the distance of the surface of the medium to the antenna determined by measurement. These emitted and received electromagnetic signals are usually microwave radiation.

Dielectric resonators are often used as antennae. Such dielectric antennae have a resonance behavior similar to hollow waveguides, but can, since they do not have metal walls, radiate electromagnetic radiation, and thus, function as antennae. As a result, several models are known from different areas of technology in each of which a dielectric material, e.g., ceramics, aids in guiding and radiating the electromagnetic waves. Usually, low-loss materials with low permittivity (another term for permittivity is dielectric conductivity) are used. Polytetrafluoroethylene or polypropylene is used, for example.

In particular, in the case of bulk materials, difficulties can arise in determining the fill level due to the occurrence of material cones. Objects, such as, e.g., a stirring device, can be further found in the container in any type of medium, these objects reflect the radar waves and cause disturbance in measuring the fill level. For this reason, it is advantageous, in some applications, to not only measure a region of the surface of the medium, but also to determine the distribution of the medium, i.e., the surface contour. Consequently, in some applications, each distance to the antenna is determined for several measuring points or measuring regions that are correspondingly distributed over the surface of the medium.

In order to measure such a surface contour, it is of particular advantage when the antennae used have a narrow as possible main direction of radiation—i.e., a narrow directivity in the main direction of radiation. Narrow directivity requires mostly a large aperture—i.e., opening area—of the radiating section. So that the aperture is also used in the sense of a narrow main direction of radiation, the electromagnetic radiation radiated from the radiating section of the antenna has to have a phase front that is as even as possible. In horn antennae known from the prior art, a narrow directivity goes hand in hand with large geometric dimensions of the antenna. In industrial measurement technology, however, small and compact measuring instruments are mostly preferred. For this reason, dielectric lenses are also used in the prior art, consisting mostly of a mixture of a resin—for example, polypropylene, polyethylene or polystyrene—and a ceramic powder. The effect, for example, of convex delay lenses is that the lens delays the radiation close to the axis as opposed to the radiation at the edges. The refracted radiation beams are parallel and in phase after passing through the lens.

European Patent Application EP 1 701 142 A2 and corresponding U.S. Pat. No. 7,408,501 B2 describe an arrangement for measuring a surface distribution of a medium using the radar principle, wherein several emitting antennae and several receiving antennae are used. These emitting and receiving antennae are individually combined with one another in order to measure more regions of the surface of the medium. Due to the number of antennae, construction is very complex.

Details for designing a dielectric antenna that has a hollow waveguide as supply element with a lens-like radiating section are found, for example, in German Patent Application DE 10 2008 020 036 A1 and corresponding U.S. Patent Application Publication No. 2009/0262038 A1.

German Patent Application DE 10 2008 008 715 A1 and corresponding to U.S. Patent Application Publication No. 2010/0321262 A1 shows an ellipsoidal lens antenna, at least in the direction of radiation. Spherical waves are converted into waves having parallel phase fronts due to the shape of the antenna. If the distance between the supply element and the antenna is changed, the direction of radiation is also changed with it. However, this is disadvantageous in that the radiation patterns are impaired by the shifting of the direction of radiation. This goes hand in hand with a reduction of the resolution at different positions of the object to be measured, i.e., the surface of the medium in measured containers.

U.S. Patent Application Publication 2003/0006941 A1 and corresponding U.S. Pat. No. 6,606,077 disclose a circular lens for a radar measuring device. Several supply elements are provided with it, each being individually controlled in order to directly change the direction of radiation.

German Patent Application DE 38 40 451 A1 describes a lens antenna having a supply element. The lens profile is designed in such a manner that spherical waves are changed in some planes into waves with even phase fronts and in other planes into waves with uneven phase fronts. In order to adjust the planes of radiation, it is provided to turn the supply element. Furthermore, the distance between supply element and antenna can be changed for calibration purposes.

A device for calibrating a radar antenna is described in German Patent Application DE 602 03 320 T2 and corresponding U.S. Pat. No. 6,531,989 B1. A lens is provided that has a concave side and a convex side.

Several antennae are known from the prior art with which the surface measurement of media can be implemented. Mostly, problems include the large amount of effort or space requirements or non-consistent measurement accuracy in all measured spatial areas.

SUMMARY OF THE INVENTION

Thus, the object of the invention is to provide a dielectric antenna and a fill level sensor having such an antenna that makes it possible to measure the surface of a medium with an essentially consistent measuring accuracy.

The above object is initially and essentially met with the antenna being discussed here in that the lens has at least one outer component and one inner component. The supply element supplies the lens with electromagnetic radiation via the inner component. Furthermore, the outer component has at least one partially spherical radiating surface and one at least partially spherical contact surface. The contact surfaces of the inner component and the inner surfaces of the outer components are designed and attuned to one another in such a manner that in at least one arrangement of inner components and outer components relative to one another, the inner component lies essentially directly against the outer component without gaps and the outer component at least partially surrounds the inner component.

The antenna according to the invention is composed of two components that guide the electromagnetic radiation of the supply element—and diffract and redirect the electromagnetic radiation of the supply element in the case of existing dielectric intermediary layers—and radiate in the direction of the surface to be measured. The two components are designed for the transmission of electromagnetic signals or electromagnetic radiation. For this reason, the components are arranged relative to one another in such a manner that the contact surface of the inner component faces away from the supply element and the inner surface faces the outer component. The radiating surface of the outer component is essentially the radiating surface of the lens.

The electromagnetic radiation of the supply element has spherical phase fronts mostly in the area of the inlet, which result via the lens in waves having even phase fronts. The running time of the waves in the outer and the inner components, the location of the supply spot—i.e., the position at which the supply element supplies the inner components with spherical waves—relative to the lens and the supply angle of the supply element, the amount of diffraction of the waves in the two components and the size of the effective aperture, i.e., the width of the opening of the antenna are all, inter alia, relevant for the transformation of the wave form.

Depending on the given prevailing conditions or demands, relevant variables such as the dimensioning of the inner and outer components, the design and arrangement of the supply element, etc. can be specified. For example, running time and refraction considerations can be taken as a basis for calculations. A suitable running time criterion for the layout is that, for generating an even phase front, the running time of different beams from the supply point, over the inner and outer components to a plane perpendicular to the direction of propagation of the even phase front must be the same. It should be taken into consideration here, that the propagation speed c of electromagnetic waves in material passed through (represented by the permittivity $\in_r$) can be described by the following correlation: $c = c_0/\sqrt{\in_r}$, with $c_0$ being the speed of light in a vacuum.

On the other hand, the refraction of the electromagnetic radiation that is generated by the outer and inner components is to be taken into consideration. In this case, Snell's law is relevant, which states that when the wave is refracted at the transition between two materials being passed through, the product, in each case, of the speed of the phase in each material and the sine of the angle of the wave to the axis of incidence, which is normal on the interface between the materials, is the same. The speed of the phase results from the square root of each permittivity.

In observing the lens of the antenna according to the invention, it should be taken into consideration that, in the case that the inner and outer components have different permittivities, Snell's law is to be applied twice. In particular, the permittivity of the outer component is chosen to be greater than the permittivity of the inner component; the aperture can be made larger in this manner. However, if the permittivity of the outer component is chosen to be smaller than the permittivity of the inner component, then the beams are refracted away from the axis at the transition and approach the desired parallel beam path in the aperture. All further variables can be determined from corresponding geometric observations.

If, in particular, the inner component is a sphere with a radius that can be preset, then the axis corresponds at every position to a linear slope through the center of the sphere. Both observations above allow for the dimensioning of the inner and outer components. At the same time, the type of supply element and its arrangement relative to the two components is also relevant.

The inner and/or the outer component(s) can be designed either homogenously or heterogeneously. A homogenous design allows for an arbitrary amount of settings between the supply element and the antenna, which result in essentially the same directivity and differ only in view of the direction of the main radiation. For the most part, a main beam with several auxiliary beams is set and this radiating arrangement is correspondingly pivoted in order to be able to measure several spatial areas with one antenna.

In the variation with a heterogeneous design, there is only a limited number of discrete arrangements to one another. As a result, however, a particular optimization of the directivity can optionally be achieved. The gap-free arrangement between inner component and outer component refers to a permanent state in one design and is a temporary state in an alternative design, i.e., during operation of the antenna as part of a fill level sensor, there are several settings—and in particular distances—of the components to one another. The latter, above all, for the case that the distance between the inner component and the outer component is variable.

It is provided in a design that the inner component is joined in a moveable manner—in particular rotatable—with the outer component. Due to the relative movement between the inner and outer component, the directivity of the antenna can be shifted in such a manner that, for example, different spatial areas of a container can be measured when the antenna according to the invention is used in a fill level sensor. If, for example, the supply element is firmly attached to the inner component or, respectively, the supply element follows the movement of the inner component, then, in the case of rotation, the direction of radiation of the electromagnetic wave follows this rotation and, thereby, the wave is also propagated into another spatial area. In the process, rotation can occur continually or in discrete steps. This is, inter alia, dependent on how the inner component, the outer component and the supply element are designed and arranged in respect to one another. In an alternative design, the inner component is firmly attached to the outer component.

In a further design of the invention, the inner component and the outer component are integrally formed, the inner component and the outer component thus commonly form an inner area and an outer area of an integrally formed antenna.

A further design provides that the outer component is designed partially as a shell or as part of a hollow sphere. In the design as a hollow sphere, the outer component faces the inner component with the concave side and the convex side facing away from the inner component. The outer component is designed, in particular, in such a manner that it at least partially incorporates the inner component.

In one design, the inner component is essentially designed as a sphere or shell, and in an alternative design, is designed at least partially as a sphere. If the inner component is a sphere and the outer component is designed as part of a hollow sphere, then, in one design, the radii of the components are chosen and attuned to one another in such a manner that, in an arrangement relative to one another, the inner component is arranged on the inner surface of the outer component and comes into contact with it essentially gap-free. In an accompanying or alternative design, the radii of the inner component and the outer component are designed and attuned to one another in such a manner that the outer component surrounds at least half of the inner component designed as sphere.

It is provided in a design that the outer component and the inner component are made of materials that have essentially different permittivities. If the permittivities differ, in particular the direction of the waves is additionally influenced in the components, and as a result, further design factors are available for the lens and its directivity. In one design, the permittivities are so high that an advantage results in that a pressure and/or explosion barrier is formed by the lens. Depending on the design, the lens is made of a dielectric material or of at least two dielectric materials.

The design of the distance between the at least one supply element and the inner component can be variable. The wave guidance that the radiated waves receive from the lens formed by the inner and outer components changes with the variation of the distance between supply element and inner component, electromagnetic radiation being coupled in the lens via the supply element. If the distance is variable, then the directivity can be changed in the mounted antenna in order to receive further measured values. In an alternative design, the inner component is in direct contact with the supply element and the distance remains constant. In a further design, the supply element is designed in such a manner that the distance of the starting point of the spherical wave, which is emitted by the supply element, is variable relative to the inner component.

In an advantageous design, several supply elements, at least one electronics unit and at least one distribution network are provided. The electronics unit generates at least one electromagnetic signal. Furthermore, it can be set via the distribution network, which supply element or supply elements emits/emit the electromagnetic signal generated by the electronics unit or an electromagnetic signal dependent thereon. In this design, several supply elements are provided, which are joined preferably with different sections of the inner component and which, for this reason, also lead to different directions of propagation of the electromagnetic radiation radiated from the lens. In an accompanying design, the associated directivities that result from the individual supply elements differ from one another. In a further design, several supply elements are designed and attuned to one another in such a manner that they commonly generate a certain directivity in conjunction with the lens, and optionally, an associated orientation between supply elements, inner and/or outer components. The individual supply elements can be chosen using the distribution network, which goes hand in hand with the selection of each measured spatial area or the associated directivity. In the process, the electromagnetic signal is the electromagnetic radiation that is emitted by the supply element.

In a further advantageous design, at least one rotating device is provided, which pivots the inner component within the outer component. If, in particular, the inner component is firmly attached to the supply element or supply elements, then rotating the inner component with the supply element(s) leads to a movement of each directivity relative to the container or space in which the measurement takes place. In a further design, several movements, in particular rotations of the inner component within the outer component are superimposed.

In another design, the at least one supply element is designed at least partially as a hollow waveguide and/or as horn antenna and/or as patch antenna and/or is formed of an electric filament conductor. In the design of the supply element, the type of phase front curve is important for designing the lens. If the lens is supplied by a hollow waveguide as supply element, the hollow wave guide is placed on the surface of the inner dielectric component. In this case, the permittivity of the dielectric medium, with which the hollow waveguide is filled, in relation to the permittivity of the inner component influences the adaptation of the transition between the hollow waveguide and the inner component. The hollow waveguide can, for example, be made inflexible, straight, curved, flexible, in one piece or in several pieces, e.g., made of discs.

Alternatively, a horn antenna is used as supply element. In order to shorten the geometric length of the antenna in one variation, only the last part of the horn antenna is used, whose excitation occurs in such a manner that the same phase front is created at the end of the horn as when using the normal horn length. A further alternative uses patch antennae, which, for example, are mounted directly on the inner component. One advantage of the patch antennae is the reduction of size of the antenna. A further variation involves using a filament conductor made of a suitable dielectric medium as the supply element.

Furthermore, the above described object is met in a further teaching of the invention with a fill level sensor using the radar principle as described at the beginning in that it has an antenna according to one of the above-mentioned designs.

In detail, there is a plurality of possibilities for designing and further developing the antenna according to the invention and the fill level sensor according to the invention as will be apparent from the following detailed description of embodiments in conjunction with the accompanying drawings.

DETAILED DESCRIPTION OF THE INVENTION

Figure 1:
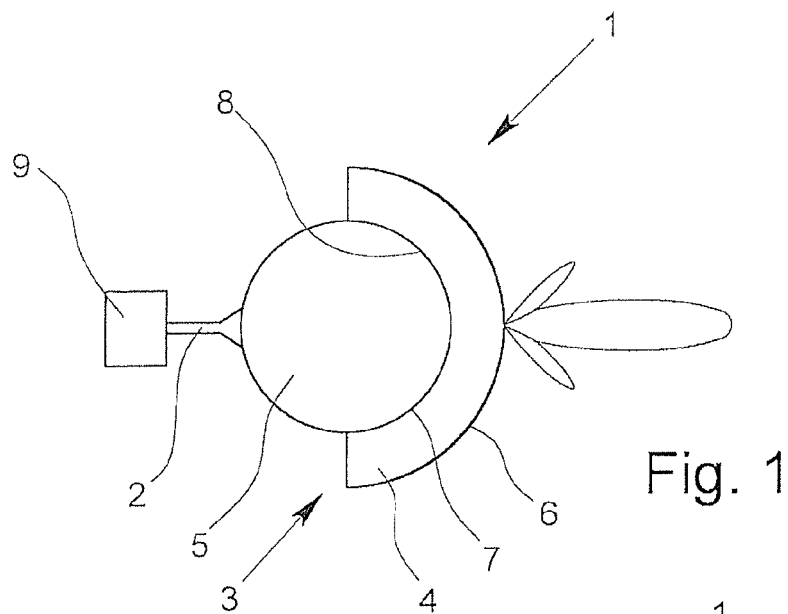
FIG. 1 is a schematic cross-sectional view of an antenna with a resulting directivity, essentially showing functional correlations.

FIG. 1 shows a cross-sectional view through a schematically represented antenna 1 according to the invention having an indicated adjusting-directivity. A variation of the antenna 1 according to the invention is shown schematically in each of FIGS. 2 & 3. FIG. 4 schematically shows a construction (not to scale) for measuring the surface of a medium with a fill level sensor according to the invention.

The antenna 1 has supply element 2 that emits electromagnetic radiation—for example, in the form of spherical waves—to a dielectric lens 3. The lens 3 has an outer component 4 and an inner component 5. The outer component 4 has, in this example, the shape of a portion of a hollow sphere, here, a hemisphere. What is shown is how radiation in the form of a main beam, and here, two auxiliary beams, is formed at the position of the radiating surface 6 of the outer component 4, which is located opposite from the supply element 2.

In the illustrated example, the inner component 5 lies directly on the inner surface 7 of the outer component 4 essentially without gaps. The inner component 5 is presently designed as a sphere. In the process, the relevant radii of the inner component 5 and the outer component 4 are attuned to one another in such a manner that the inner component 5 fits exactly into the outer component 4. In alternative embodiments—not shown here—the inner and outer components are only designed as a sphere in sections or have other geometries fitting to one another, wherein it is possible that a gap or distance exists between both components in different arrangements.

An electronics unit 9 generates the electromagnetic radiation, which is emitted by the supply element 2 and is supplied to the lens 3. In this example, the main direction of radiation of the lens 3 is located diametrically across from the supply element 2—in respect to the spherical inner component 5. Using this as a basis, the result is that a change of the section, via which the supply element 2 supplies the lens 3 with electromagnetic radiation, also leads to a change of the main direction of radiation. The symmetrical construction of the lens 3 goes hand in hand with essentially same directivities. For this reason, it is possible to measure different spatial areas with an antenna having a lens, without essentially changing the measuring accuracy. The advantage in this case is exactly the easy variability of the main direction of radiation.

Figure 2:
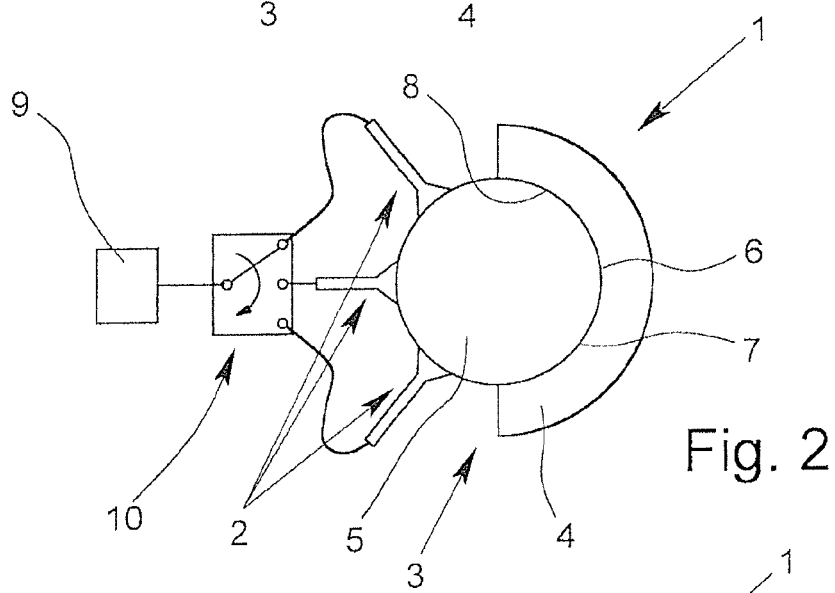
FIG. 2 is a schematic representation of an antenna with associated elements according to a first variation, essentially showing functional correlations.
Figure 3:
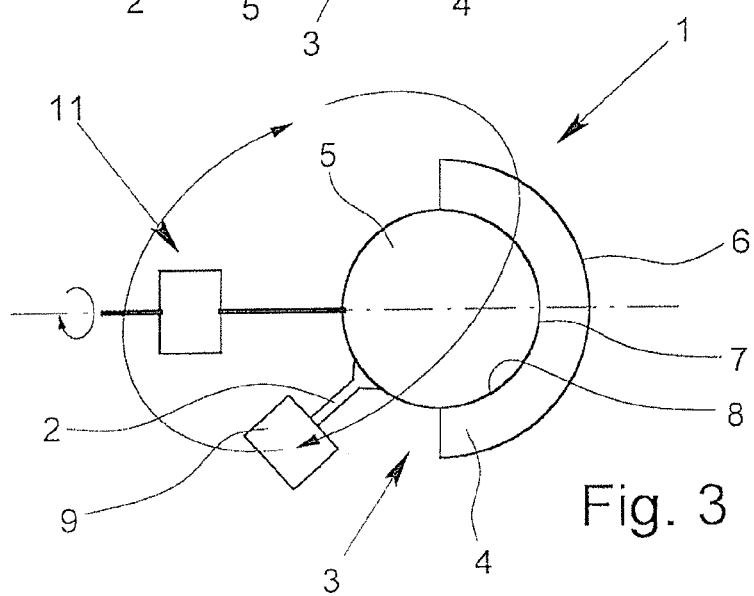
FIG. 3 is a schematic representation of an antenna with associated elements according to a second variation, essentially showing functional correlations.
Figure 4:
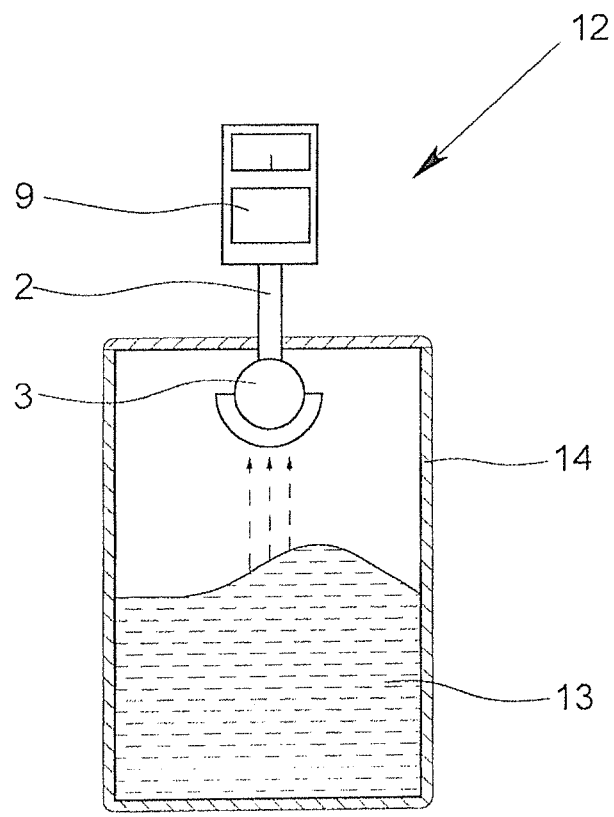
FIG. 4 is a schematic cross-sectional view of a fill level measurement with a fill level sensor according to the invention.

Two variations of the antenna 1 according to the invention are shown in FIGS. 2 & 3, which allow for the main direction of radiation to be changed.

In the embodiment in FIG. 2, three different supply elements 2 are provided, each of which are joined to the inner component 5, but at different sections, and supply each of these sections with electromagnetic radiation. As in FIG. 1, the radiation is generated by the electronics unit 9, which, however, in the embodiment shown here, is joined to the three supply elements 2 via a distribution network 10. Here, the distribution network 10 can also be a component of the electronics unit 9. The supply element 2 that emits the radiation is chosen via the distribution network 10. Since the main direction of radiation of the antenna 1 in FIG. 2 should be essentially the same as that of the antenna in FIG. 1, selection of the supply element 2 of the antenna 1 leads to the radiation being radiated in other spatial areas, and thus, the fill level being measured in another area. If the electromagnetic radiation is alternately provided to the three supply elements 2 via the distribution network 10 during measurement, then three areas of the surface of the medium are measured with it, and in this manner, a correspondingly more accurate conclusion can be made about the fill level.

The supply elements 2 are, in particular, firmly attached to the inner component 5. Since only three areas of the lens 3 overall are used for transforming/guiding/shaping the waves, the outer component 4 and the inner component 5 are designed heterogeneously in one embodiment, in that only the respective areas for the transforming of the waves coming from the supply element 2 into waves with an even phase front are optimized. The spherical form of the two components 4, 5 is maintained in an embodiment in this manner.

FIG. 3 shows an alternative to the embodiment in FIG. 2, wherein, however, both variations can be combined with one another. In the embodiment in FIG. 3, only one supply element 2 is provided, which is firmly attached to the inner component 5 via an input area. At the same time, a directivity of the lens 3 with a main direction should also result which is diametrically opposite the supply element 2 relative to the inner component 5. The inner component 5 is located in the outer component 4 so that it can be rotated, wherein the rotation, here, occurs via a rotating device 11, which is joined to the inner component via an axle. The arrow indicates a possible path of rotation of the inner component 5, which also describes the path of the main direction of radiation of the lens 3. The rotating of the inner component 5 with the attached supply element 2 thereby allows for several measurements of different areas of the surface of the medium. The main axis of the antenna is represented here by a dash-dot line.

Measurement by means of a fill level sensor 12 according to the invention is shown schematically in FIG. 4. The measuring device 12 has an antenna 3 as described above, which is joined via a supply element 2 to an electronic device 9. The electronic device 9 generates the electromagnetic waves which are transmitted to the antenna 3 via the supply element 2 and are transformed by it into waves with an even phase front. The radiated waves strike the surface of the medium 13, are reflected there and return again to the antenna 3. The medium 13 in the tank 14 in the illustrated example is a bulk material whose surface exhibits a cone of material. For the exact measurement of the fill level, one measurement is, thus, not sufficient, rather several regions of the surface are preferably measured. This happens, here, using the antenna 3, which allows for a simple change in the main direction of radiation of the microwaves without resulting in essential changes in the directivity of the antenna 3.

What is claimed is:

1. Dielectric antenna, comprising:
   at least one electronics unit which generates electromagnetic radiation,
   at least one lens made of at least one dielectric material for guiding and radiating the electromagnetic radiation,
   at least one supply element which supplies the electromagnetic radiation from the electronics unit to the at least one lens,
   wherein the lens has at least one outer component and an inner component,
   wherein the outer component has an outer, radiating surface that is at least partially spherical and an inner surface that is at least partially spherical, and
   wherein the inner component receives the electromagnetic radiation from the supply element and has a contact surface that is at least partially spherical and contacts the inner surface of the outer component.

2. Antenna according to claim 1, wherein the contact surface of the inner component and the inner surface of the outer component are configured and attuned to one another in such a manner that in at least one arrangement of the inner component and outer component, the inner component lies directly against the outer component essentially without a gap therebetween and wherein the outer component at least partially surrounds the inner component.

3. Antenna according to claim 1, wherein the inner component is joined with the outer component in a moveable manner.

4. Antenna according to claim 1, wherein the inner component is movable manner that is rotatable relative to the outer component.

5. Antenna according to claim 1, wherein the outer component is a partially spherical shell or a portion of a hollow sphere.

6. Antenna according to claim 1, wherein the inner component is essentially a sphere or spherical shell.

7. Antenna according to claim 1, wherein the inner component is essentially at least partially a sphere.

8. Antenna according to claim 1, wherein the outer component and the inner component are made of materials that have different permittivities.

9. Antenna according to claim 1, wherein a distance between the at least one supply element and the inner component is variable.

10. Antenna according to claim 1, wherein said at least one supply element comprises a plurality of supply elements each of which is joined to the inner component at a different location and the at least one electronics unit by at least one distribution network, the distribution network determines which of the supply elements receives the electromagnetic radiation generated by the electronics unit or an electromagnetic signal dependent thereon.

11. Antenna according to claim 4, further comprising at least one rotating device connected to the inner component in a manner enabling the at least one rotating device to rotate or pivot the inner component within the outer component.

12. Fill level sensor using the radar principle, comprising:
a vessel for containing a medium and
a dielectric antenna mounted to said vessel at a location situated above an area of the vessel in which a medium will be disposed in use, said dielectric antenna comprising:
at least one electronics unit which generates electromagnetic radiation,
at least one lens made of at least one dielectric material for guiding and radiating the electromagnetic radiation,
at least one supply element which supplies the electromagnetic radiation from the electronics unit to the at least one lens,
wherein the lens has at least one outer component and an inner component,
wherein the outer component has an outer, radiating surface that is at least partially spherical and an inner surface that is at least partially spherical, and
wherein the inner component receives the electromagnetic radiation from the supply element and has a contact surface that is at least partially spherical and contacts the inner surface of the outer component.

13. Fill level sensor according to claim 12, wherein the contact surface of the inner component and the inner surface of the outer component are configured and attuned to one another in such a manner that in at least one arrangement of the inner component and outer component, the inner component lies directly against the outer component essentially without a gap therebetween and wherein the outer component at least partially surrounds the inner component.

14. Fill level sensor according to claim 1, wherein the inner component is joined with the outer component in a manner that is rotatable relative to the outer component.

15. Fill level sensor according to claim 1, wherein the outer component is a partially spherical shell or a portion of a hollow sphere.

16. Fill level sensor according to claim 12, wherein the inner component is essentially a sphere or spherical shell.

17. Fill level sensor according to claim 12, wherein the inner component is essentially at least partially a sphere.

18. Fill level sensor according to claim 12, wherein the outer component and the inner component are made of materials that have different permittivities.

19. Fill level sensor according to claim 12, wherein a distance between the at least one supply element and the inner component is variable.

20. Fill level sensor according to claim 12, wherein said at least one supply element comprises a plurality of supply elements each of which is joined to the inner component at a different location and the at least one electronics unit by at least one distribution network, the distribution network determines which of the supply elements receives the electromagnetic radiation generated by the electronics unit or an electromagnetic signal dependent thereon.

21. Fill level sensor according to claim 14, further comprising at least one rotating device connected to the inner component in a manner enabling the at least one rotating device to rotate or pivot the inner component within the outer component.

* * * * *